United States Patent [19]

Colbert et al.

[11] Patent Number: 5,073,950

[45] Date of Patent: Dec. 17, 1991

[54] FINGER PROFILE IDENTIFICATION SYSTEM

[75] Inventors: Charles Colbert; Andrew D. Jerison, both of Yellow Springs; David K. Berelman-Hall, Xenia; Donald R. Moles, Yellow Springs, all of Ohio; Nathan D. Potter, Corvallis, Oreg.

[73] Assignee: Personnel Identification & Entry Access Control, Inc., Yellow Springs, Ohio

[21] Appl. No.: 337,793

[22] Filed: Apr. 13, 1989

[51] Int. Cl.$^5$ .............................................. G06K 9/00
[52] U.S. Cl. .............................................. 382/2; 382/46
[58] Field of Search ........................... 382/2, 4, 5, 46; 356/71

[56] References Cited

U.S. PATENT DOCUMENTS

| | | | |
|---|---|---|---|
| 3,576,537 | 4/1971 | Ernst | 340/149 |
| 3,648,240 | 3/1972 | Jacoby et al. | 382/4 |
| 3,729,634 | 4/1973 | Jensen et al. | 250/204 |
| 3,746,429 | 7/1973 | Spindel et al. | 350/266 |
| 3,937,580 | 2/1976 | Kasdan | 356/156 |
| 3,944,978 | 3/1976 | Jensen et al. | 382/4 |
| 4,107,775 | 8/1978 | Ott | 382/2 |
| 4,204,772 | 5/1980 | Balasubramanian | 356/376 |
| 4,206,441 | 6/1980 | Kondo | 382/2 |
| 4,573,193 | 2/1986 | Shuto et al. | 382/4 |
| 4,586,441 | 5/1986 | Zekich | 109/8 |
| 4,720,869 | 1/1988 | Wadia | 382/2 |
| 4,736,293 | 4/1988 | Sidlauskas | 382/2 |

Primary Examiner—Leo H. Boudreau
Attorney, Agent, or Firm—Biebel & French

[57] ABSTRACT

A method of and apparatus for verifying the indentity of an individual is based on the profile of a hand print. A set of reference data is created by determining the location of the edges of each finger separately to generate a set of finger profiles, establishing a central axis for each finger profile by reference to the edges thereof, rotating the central axis of each finger profile until it is normal to a reference line, determining the width of each finger profile at predetermined locations parallel to said reference line, and recording said finger profile information. Thereafter, a candidate's finger profile can then be compared with the reference profile by comparing the width of each finger profile at predetermined locations, determining whether the corresponding between finger widths at said predetermined locations meets a predetermined criteria, and then indicating acceptance or rejection of the candidate. The apparatus does not require posts or groves to force the hand or fingers into any predeterminded position.

18 Claims, 5 Drawing Sheets

FINGER PROFILE IDENTIFICATION SYSTEM

BACKGROUND OF THE INVENTION

A number of devices currently exist which employ biometrics to verify an individual's identity for security purposes. While some of these devices have been marketed for commercial purposes, none has yet to be found to be useful, reliable, and/or economical enough for large-scale adoption.

SUMMARY OF THE INVENTION

This invention relates to novel method and apparatus for verifying the true identity of an individual seeking entry to a secured installation. The method uses the statistically valid theory that an individual's hand geometry, such as finger size and shape, are different from person-to-person, much like fingerprints. An individual's finger profiles are recorded in a memory that may be either on a credit-card-type ID or elsewhere. When that person subsequently applies for entry to a secured installation requiring the ID, the identity is verified by a comparison between the current finger profiles and the reference profiles in the memory. The system then recommends an accept or reject decision based on one or more statistical criteria.

Yet another feature of the invention is that the same device may be used with x-ray images of the fingers, or other body parts (instead of video images of live fingers), wherein bone shapes derived from previously stored x-ray images are compared with those of recent images. This ability may be useful for forensic purposes such as identifying combat casualties or accident victims.

Anticipated uses for the system include military bases, intelligence facilities, nuclear installations, bank vaults, computer rooms and computers; preventing use of automatic bank teller machines by means of lost, stolen, or counterfeit I.D. cards; and preventing time-card fraud.

Both the mechanism and software or firmware required for performing the above computations to accomplish an entry decision are remarkably simple and inexpensive.

A feature of the invention is the ability of the system to accommodate various hand placements. Also, the system employs an autocorrelation procedure which further accommodates normal age-related variations in the finger profile. As long as an individual does not have a degenerative joint disease, the initial finger shape data can serve as his ID for many years without updating.

A method of verifying the identity of an individual based on the profile of a hand print, the method comprising the steps of creating a set of reference data by a) determining the location of the edges of each finger separately thereby to generate a set of finger profiles, b) establishing a central axis for each finger profile by reference to the edges thereof, c) rotating the central axis of each finger profile until it is normal to a reference line, d) determining the width of each finger profile at predetermined locations parallel to said reference line, and e) recording said finger profile information; and thereafter determining a candidate's finger profile in accordance with steps a) to d) above, comparing the candidate's finger profile with the reference profile by comparing the width of each finger profile at predetermined locations, determining whether the correspondence between finger widths at said predetermined locations meets a predetermined criteria, and indicating acceptance or rejection of the candidate. It is also an object of this invention to provide an apparatus for performing these method steps.

Other objects and advantages of the invention will be apparent from the following description, the accompanying drawings and the appended claims.

BRIEF DESCRIPTION OF THE DRAWINGS

FIG. 5a shows the front slither, FIG. 5b shows the middle slither and FIG. 5c shows the back slither.

DESCRIPTION OF THE PREFERRED EMBODIMENT

Figure 1:
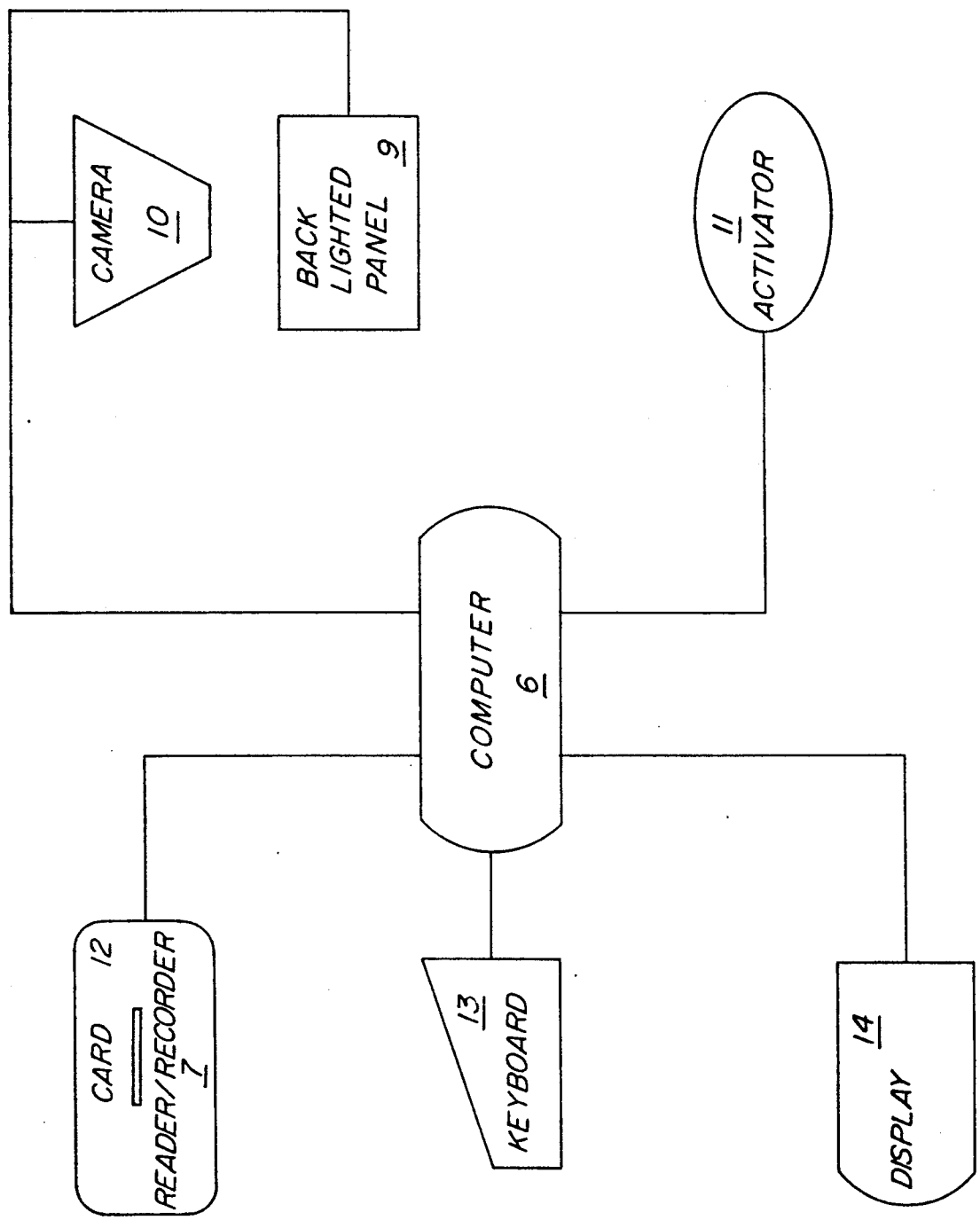
FIG. 1 is a block diagram showing the components comprising the invention.
Figure 2:
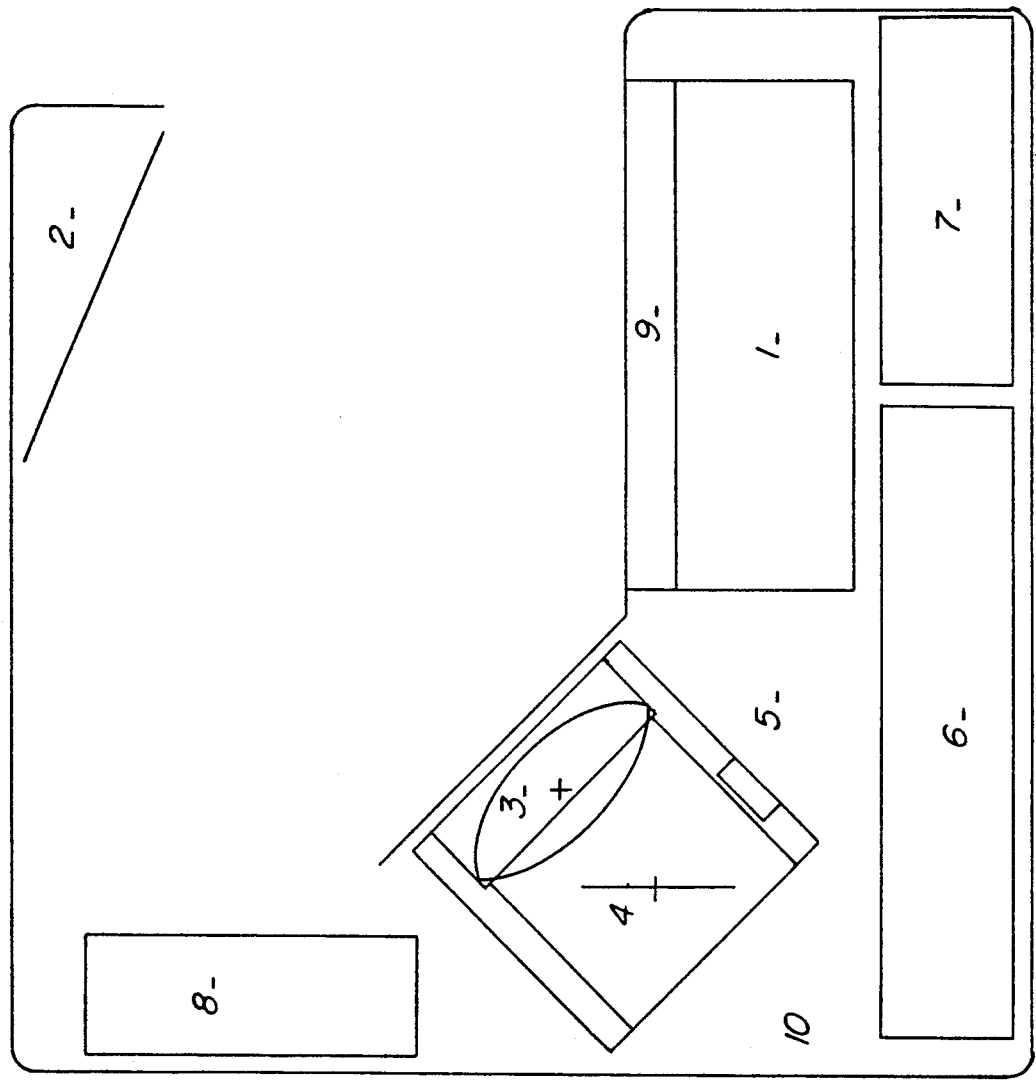
FIG. 2 is a cross-sectional side view of a finger scanning device constructed according to the invention.

Referring now to the drawings which depict a biometric personnel verification system for screening entry access to controlled areas or equipment, the device shown in FIGS. 1 and 2 includes a video camera 10 for generating a high-resolution silhouette of an individual's finger shapes and sizes. This silhouette is converted into a numerical array of width values for each finger, taken at predetermined intervals (such as 1 mm) from interdigital web to fingertip. A typical profile of a single finger might consist of 50 to 100 width values. Profiles of four to eight fingers are recorded; thumbs are generally not used.

Upon enrollment of an authorized individual, the device stores finger shape and size reference data derived from high-resolution video scan imagery on a RAM-type encoded ID card or in a secure data base. Thereafter, when seeking acceptance to a secure area, an individual inserts his ID card in the card reader 7, enters on keyboard 13 a personal identification number (if required), and places his hand on a panel or stage 9 where it is viewed by the solid-state video camera 10. The device then scans the individual's fingers and generates finger shape candidate data.

The previously stored finger profile information, or reference data, is then compared with the current finger profile, or candidate data. To compare profiles, the system uses characteristics referred to herein as discriminants, which are algorithms that measure sameness. The numerical score resulting from a comparison ranges in value from 0.000 to 1.000; a perfect match would be 1.000. More than one discriminant may be used to create the match score to increase the reliability of the process.

When initially applying for an ID card, an authorized person inserts a blank ID card into slot 12 of card reader/recorder 7 and places his hand, fingers spread, on the stage 9, a backlighted translucent panel. Backlighting is provided by an incandescent, luminiscent, or fluorescent light source 1.

The image of the fingers is reflected off mirror 2 and through lens 3 onto motor-driven mirror 4 which sweeps the image in 1-mm steps across CCD linear sensor array 5. The image data output of 5 is digitized by flash A/D 15, FIG. 4, applied to a computer processor 6, line-by-line where the individual finger edges are separated into left and right paired arrays and the center lines of all fingers are determined.

Figure 3A:
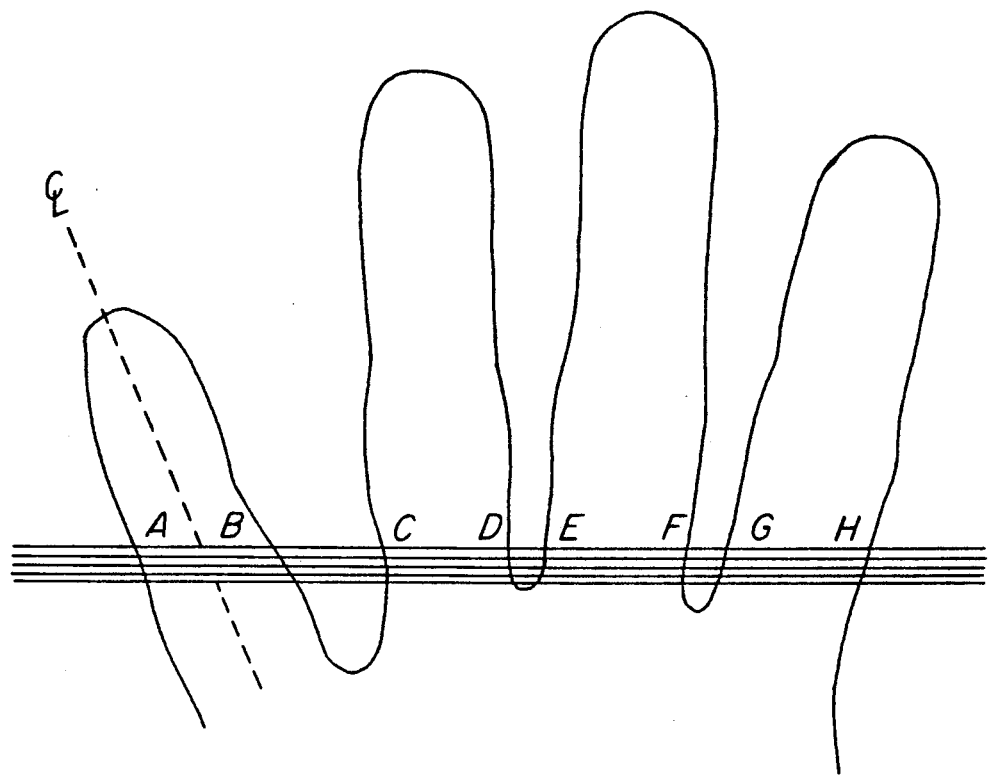
FIG. 3a shows a hand profile of four fingers as typically placed on the back lighted panel with the scanning lines passing across each finger.

The silhoutte shown in FIG. 3a is in the form of left and right paired coordinates at 1-mm intervals comprises the outlines of four fingers, excluding the thumb. These eight arrays are stored temporarily in computer memory 6, then rotated as illustrated in FIG. 3 to correct for angular deviations owing to finger-spread, and then stored in computer memory 6. The process for finger rotation or normalization will be described below.

Figure 3B:
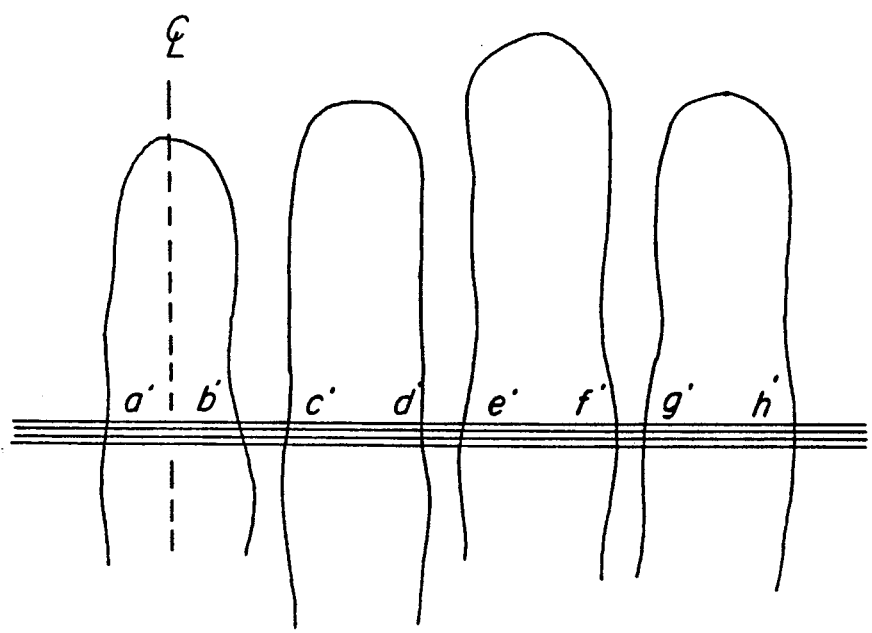
FIG. 3b shows a hand profile after the fingers have been mathematically rotated.

Each stored array is then read from memory in 1-mm slices from interdigital web to fingertip, yielding a sequence of width values which are perpendicular to the central axis of the finger (FIG. 3b).

The set of about 75 to 100 width values for each finger, called the profile, is sent to the card reader/recorder 7. The shape information called reference profiles is now stored in the card's random access memory (RAM) or magnetic or optically encoded strip on the back of an ID card which was inserted into the card slot 12 of the card recorder/reader 7. Alternatively, reference profile data may be stored in a secure data base.

A secure facility has a similar device as described above. When applying for entry to the facility, the candidate inserts the ID card into the slot of 7 which now acts as a card reader, enters an assigned personal identification number (PIN) via keyboard 13, FIG. 1, and places his hand on backlighted panel 9. Solid-state video camera 10 reads each finger silhouette and generates the candidate profiles of the fingers as described above.

Figure 4:
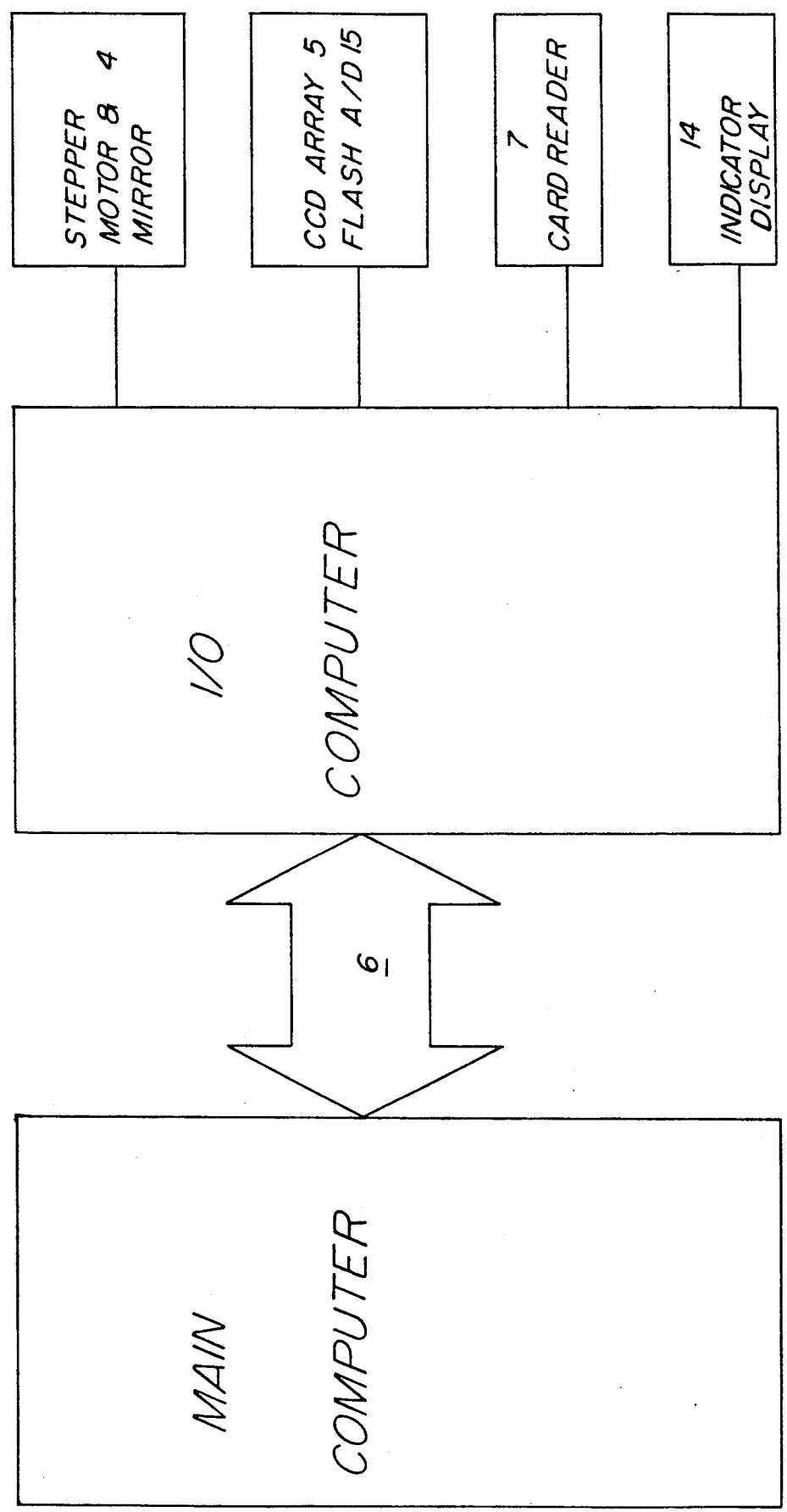
FIG. 4 is a block diagram of the basic components making up a computer processor.

A computer processor 6, FIG. 4, then compares the pre-stored reference profiles originally obtained from card reader 7 with the current candidate profiles by means of a battery of discriminants. The shape and size discriminants are chosen to be as nearly independent as possible from one another so that the quality of the match may be tested using a number of distinct parameters. A composite of the discriminant scores from all the fingers, called the Grand Match Number, ranges in value from 0.000 to 1.000 with a perfect match being 1.000.

Prior trials determine the score which must be achieved to declare acceptance of the candidate. A display panel indicator 14, FIG. 4 announces whether the candidate is accepted or rejected. (The display panel, may also provide other messages, such as advising the candidate to reposition the hand.) Subsequent to the accept/reject decision, an activator mechanism 11 such as a solenoid may operate an alarm, a door latch, turnstile, or other entry device.

Since the finger placement during enrollment and at the time of requested entry will not be the same, a direct comparison between the data would not be meaningful. Therefore, this invention provides a method for rotating and translating the data obtained from the finger scans, that is figuratively to rotate the fingers so that they are all essentially parallel and that the slices recorded and compared are normal to the central axis of each finger, both at enrollment and later on.

NORMALIZATION OF HAND DATA

When the camera scans a hand, the data produced is filtered by hardware and intelligent software. The result is a list, for each scanline, of the places where the image brightness goes from dark to light and vice versa. The list is a set of numbers whose values are the pixel numbers at which these transitions occur. This list is conditioned so that certain assumptions may always be made concerning the number of transitions on each scanline.

After the transition list is obtained, the program separates the list into fingers, i.e. each point in the list is identified with the right or left side of a particular finger. The data for each finger is then normalized. This process involves rotating and translating the finger data points in the two dimensional plane ($R^2$) so that the central axis of the finger is identified with the vertical axis and the pair of points (right and left side) on the finger that have the lowest value in their vertical coordinate (after the rotation has been performed) lie on the horizontal axis.

FINGER SEPARATION

The transition list must be sorted by finger, and each finger sorted by right and left side. This accomplished by following the perimeter of the hand and looking at the extreme points (with respect to the vertical axis) of the image. The data has been previously conditioned so that it may be assumed that:

1) Each scanline has no more than 8 transitions.
2) Each scanline has an even number of transitions.
3) There are no radical discontinuities in the image.

With this in mind, it is assumed that the first transition on the first scanline belongs to finger 1. The algorithm then proceeds around the perimeter of the hand image. The tip and web of the fingers are identified with local maxima and minima, respectively.

FINGER ROTATION

After the transition list has been reorganized into fingers, each finger is normalized. This is accomplished by performing a number of operations on the transition list data for the finger, these are:

1) Change the coordinate system of the data from pixels to hundredths of a mm.
2) Find the best center line through the finger. Since the transition list for the finger has already been organized into right and left sides, the location of the first (proceeding from the base to the tip of the finger) actual right/left pair must be found. After this is accomplished, one may assume (because of the previous data conditioning) that the rest of the data points are paired. It is simple to find the coordinates of the midpoint between each pair. A list of these midpoints is made and passed to a modified linear regression (one which minimizes the sum of the squares of the perpendicular distance from each point to the best line, as opposed to the sum of the squares of the vertical distance from each point to the best line).
3) Use the slope of the center line, m, to calculate an orthonormal basis for $R^2$, $B' = \{x1, x2\}$, where x1 is a unit vector that points along the center line of the finger from base to tip, and x2 is a unit vector perpendicular to x1 such that the crossproduct of x1 and x2 yields a vector in the positive Z direction (right hand coordinate system).

4) Build a linear transformation, T that maps the Basis B' to the (Standard) Basis, B={e1,e2}={(1,0), (0,1)}. The transformation T is a rigid motion of the plane, i.e. the image will not be distorted by the transformation.

5) Apply T to the finger data. This will rotate the finger so that the finger center line is identified with the vertical axis and the vector pointing from the base to the tip of the finger will point in the positive direction.

6) Perform a vertical axis shift on the data points so that the lowest pair of right/left points (those with the smallest vertical coordinate) on the finger lie on the horizontal axis.

7) Change vertical coordinates to mm.

These seven steps can be combined into one simple operation. First, let T be the linear transformation on $R^2$ that rotates the finger around the origin (0,0), so that the center line of the finger is superimposed on the vertical axis. In addition to the rotation, the finger must also be translated to a standardized position relative to the origin. (Remember that it was rotated around the origin, leaving it in the proper orientation, but at some indeterminate position on the plane.) To solve this problem, T is used to build another type of function, called an affine transformation. An affine transformation performs both rotations and translations on its domain. The function T can be represented by a $2 \times 2$ matrix and the affine transformation used can be represented by a $3 \times 3$ matrix as:

$$[A_r] = \begin{vmatrix} r11 & r12 & 0 \\ r21 & r22 & 0 \\ 0 & 0 & 1 \end{vmatrix} \quad ([A_r] \text{ could be thought of as a rotation matrix})$$

$$\text{where, } [T] = \begin{vmatrix} r11 & r12 \\ r21 & r22 \end{vmatrix}.$$

The above affine transformation performs only the transformation T, and not a translation. The matrix of an affine transformation to perform a simple translation would look like:

$$[A_t] = \begin{vmatrix} 1 & 0 & tx \\ 0 & 1 & ty \\ 0 & 0 & 1 \end{vmatrix}$$

where,
tx=the translation performed along the x axis.
ty=the translation along the y axis.

The matrix of an affine transformation that will change coordinate systems would look like:

$$[A_c] = \begin{vmatrix} dx & 0 & 0 \\ 0 & dy & 0 \\ 0 & 0 & 1 \end{vmatrix}.$$

It is a nice property of matrices (and of linear and affine transformations) that instead of performing steps 1 through 7 one at a time, one can combine many of these steps into one function (matrix). For this problem it is effective to find the center line first (before changing the coordinates of all the data points to hundredths of mm) and then build the rotation transformation A whose matrix is described above. Using this and other matrices, perform the following operations (order is significant; matrices do not in general commute):

1) Change coordinate systems to hundredths of mm.
2) Translate the center of mass of the finger to the origin.
3) Rotate finger around origin (now center of mass).
4) Translate finger along the vertical axis so that the lowest left-right pair lies on the horizontal axis.

The matrix representation of this process would look like:

$$[F_{norm}] = [A_{t2}][A_r][A_{t1}][A_{c1}][F].$$

Where the matrices of the affine transformations look like:

$$[A_{c1}] = \begin{vmatrix} dx_1 & 0 & 0 \\ 0 & dy_1 & 0 \\ 0 & 0 & 1 \end{vmatrix} \quad [A_{t1}] = \begin{vmatrix} 1 & 0 & tx_1 \\ 0 & 1 & ty_1 \\ 0 & 0 & 1 \end{vmatrix}$$

$$[A_r] = \begin{vmatrix} r11 & r12 & 0 \\ r21 & r22 & 0 \\ 0 & 0 & 1 \end{vmatrix} \quad [A_{t2}] = \begin{vmatrix} 1 & 0 & 0 \\ 0 & 1 & ty_2 \\ 0 & 0 & 1 \end{vmatrix}$$

where,
$dx_1$=horizontal dimension of a pixel in hundredths of mm.
$dy_1$=vertical dimension of a pixel in hundredths of mm.
$tx_1$=-(center of the fingers mass along horizontal axis).
$ty_1$=-(center of the fingers mass along vertical axis).
r11=r22=m/mag_m.
r12=-r21=-1/mag_m.
m=slope of finger center line.
mag_m=+/-sqrt(m*m+1)
Note: If m<0 then make mag_m<0
$ty_2$=distance (in hundredths of mm) to shift the finger along the vertical axis (as in 4 above).

The data points of the finger F are represented in the matrix:

$$[F] = \begin{vmatrix} fx_1 & fx_2 & fx_3 & \ldots & fx_n \\ fy_1 & fy_2 & fy_3 & \ldots & fy_n \\ 1 & 1 & 1 & \ldots & 1 \end{vmatrix}$$

and each column vector ($fx_1, fy_1, 1$) is a point on the finger F.

The equation:

$$[F_{norm}] = [A_{t2}][A_r][A_{t1}][A_{c1}][F].$$

can be reduced to a single matrix multiplication, $$[F_{norm}] = [A^*][F].$$

where
$$[A^*] = [A_{t2}][A_r][A_{t1}][A_{c1}].$$

It is desirable to calculate [A*] before working on F, for doing so greatly reduces the number of calculations necessary for the computation.

After applying A* to F, change the vertical coordinates from hundredths of mm to integer format mm. This obviously involves a loss of precision. To diminish the impact of this look at each mm section and average the horizontal coordinates of the points (left and right side separately, of course) that lie within the section to get the horizontal coordinate of the point at that section. After this reduction in resolution, data is checked for discontinuities.

The following items constitute a description of various discriminants and their derivations.

DISCRIMINANT I—WIDTH

The simplest discriminant is the coefficient of determination ($r^2$) wherein corresponding slice widths between the reference and the candidate profiles are compared. Because the candidate's fingers may not be placed in the same positions on the panel as the reference fingers a means must be followed to bring the two profiles into register so that they can be compared. This is done by shifting the profiles with respect to each other one slice at a time while testing the value of $r^2$ at each shift until it reaches a maximum. At perfect match between identical profiles, the value of $r^2 = 1.000$. The point of best alignment between any two profiles is referred to as register. The numerical value of $r^2$ at register is a measure of sameness of the profiles and is called Profile $r^2$.

DISCRIMINANT II—SHAPE PROMINENCES

The first step is to locate and record the shape prominences (joints and mid-shaft depressions) of the fingers as revealed by the reference profiles. The technique to do this is called autocorrelation. The second step is to do the same for the candidate profiles. The third step is to compare the locations of the corresponding prominences between candidate and reference autocorrelations. To extract these salient shape features from a profile, the autocorrelation procedure compares an original parent profile with itself in the form of a clone. This has the effect of exaggerating the subtle prominences at the joints and depressions at the midshafts of the fingers.

An advantage of the autocorrelation procedure is that it forgives or accommodates any changes in the fingernail length, gross finger shape due to edema, or hand pressure, as long as such changes do not obliterate joint features altogether. Prominences located by autocorrelation also permit long-term identification despite normal variation in finger shapes due to aging. However, it is recognized that in some persons with severe, progressive osteodegenerative disease such as arthritis, the reference profiles may have to be updated periodically.

The following is a description of the autocorrelation procedure which is carried out with the reference profiles and with the candidate profiles to be compared. The basic idea is described first and a modified form is described thereafter.

A clone is made of an original (parent) profile, and an autocorrelation match curve is generated by measuring successive values of $r^2$ as the clone profile is shifted stepwise relative to the parent profile by a distance at least as great as the separation between distal and proximal joints.

When the clone is in exact register with the parent profile, a peak is noted on the autocorrelation graph where the value of $r^2 = 1.000$. Register, then, becomes a reference point to which prominent features of the autocorrelation curve can be referred.

Shifting the clone in 1-mm intervals along the length of the parent profile, causes the value of $r^2$ to decline as the two profiles become progressively further out of register. Minimum $r^2$ (nadir) occurs when the distal prominence of the clone aligns with the midshaft depression of the parent. The number of 1-mm intervals from register required to reach this nadir, determines the distance between the distal interphalangeal joint and the midshaft of the middle phalanx, and this value (in mm) is recorded for future reference.

Shifting the clone past the nadir to the point where the distal joint prominence of the clone lines up with the middle interphalangeal prominence of the parent, locates a pseudo-match (zenith), a local maximum in the value of $r^2$. The number of 1-mm steps from register to this zenith is the distance between the distal and middle interphalangeal joints. Further shifting (misalignment) may locate yet another nadir relative to register. The number of matchable points (n) declines with each shift away from register, and this undesirable condition introduces some artifacts in the autocorrelation curve.

Figure 5A:
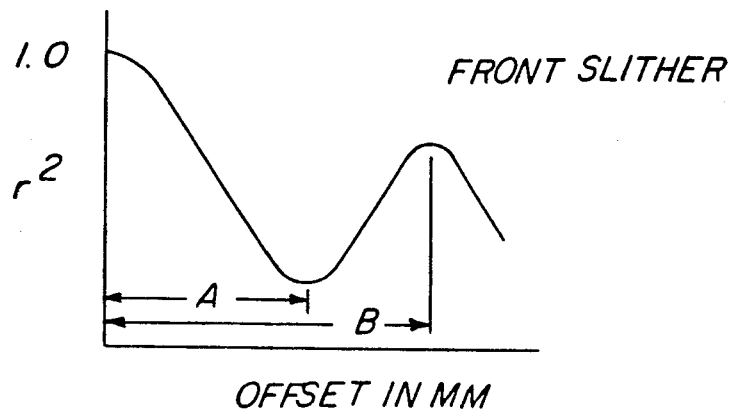
FIGS. 5a, 5b and 5c are curves representing the autocorrelation process where
Figure 5B:
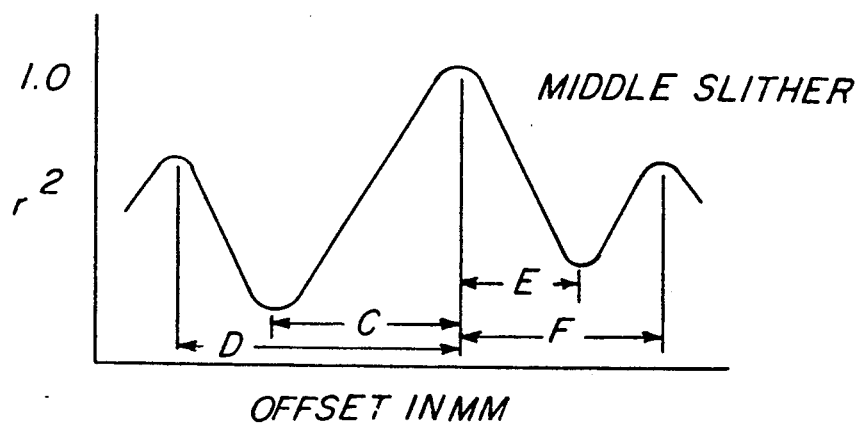
Figure 5C:
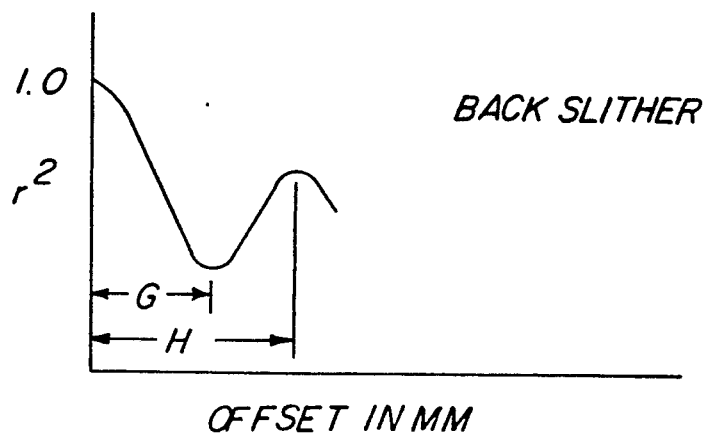

So, to keep n constant the autocorrelation procedure is refined by dividing each clone into three segments: a front section (from fingertip to a point proximal to the distal joint); a middle section (spanning the middle phalanx); and a back section (from midfinger to the web). Each clone section is shifted separately along the parent profile, generating three separate autocorrelation curves called the front, middle, and back slither curves (FIG. 5). The undulations (nadirs and zeniths) in each slither curve for each finger locate the joints and the mid-shaft depressions relative to register, and serve as markers for subsequent comparison of finger prominences.

The pattern of a slither curve, with its characteristic peaks and valleys, mimics the features of a house key. The shape of such a curve generated at enrollment can be compared with its candidate couterpart point-for-point by using the coefficient of determination ($r^2$), where a perfect match would yield a score of 1.000. A composite of $r^2$ values for all four fingers is called Slither $r^2$ and ranges in value from 0.000 to 1.000. A composite record of three candidate slither curves for all fingers is called a KEY. The corresponding record from previously stored slither curves (the reference record) is called a LOCK.

As with a conventional lock and key, the goal is to permit entry access only to an individual whose KEY fits the pre-recorded reference LOCK. Both LOCK and KEY record the locations of the various shape prominences of all fingers in the form of a numerical matrix, wherein each cell records the number of millimeters from register to each nadir and zenith.

Because a KEY is generated on the basis of a single hand insertion, it may be influenced by hand placement or pressure. Therefore, the LOCK is constructed from data based on multiple hand insertions at the time of enrollment. In so doing, reliance is placed not on a single LOCK, but rather the KEY is allowed to try to fit the series of pre-recorded LOCKS.

When a KEY is tried, the computer matches it sequentially with each LOCK. Any differences between corresponding cell values are recorded in a series of least difference matrices which are updated with each successive LOCK. As the KEY is matched in turn against each LOCK, each cell value in the latest difference matrix is replaced by the smallest difference. Thus, as the entire series of LOCKS (the GRANDLOCK) is invoked, each cell value tends toward zero. The LDM score is the sum of all the cell values in the final Least Difference Matrix. A perfect match between KEY and GRANDLOCK would result in an LDM score of 0.

A Greatest Difference Matrix is generated by the identical procedure (i.e., matching the KEY to the GRANDLOCK), except that each cell value is successively replaced by the largest difference between KEY and LOCK. The GDM score is the sum of all the cell values in the Greatest Difference Matrix. The sequential updates thereby cause the GDM score to increase.

It is expected that the cell differences in a Greatest Difference Matrix between the KEY and the LOCK series for a true match will not be very great even when the last LOCK has been tried, and thus the GDM score for a true match will be substantially lower than for a false match.

The GDM score and LDM score are combined to yield a measure of sameness between two profiles. This measure is the Congruence Index (CI), based on the premise that for a true match the LDM score is much smaller than for a false match. CI is computed according to the following formula:

$$CI = (GDM\ \text{Score} - LDM\ \text{Score})/GDM\ \text{Score}$$

Thus, as LDM approaches zero, CI approaches 1.0.

An alternative formula for the quality of the match is:
$$CI^* = (GDM\ \text{Score} - LDM\ \text{Score})/(GDM\ \text{Score} + LDM\ \text{Score})$$

DISCRIMINANT III—MERIT INDEX

A discriminant termed the Merit Index counts the number of cells in the Least Difference Matrix whose values do not exceed some predetermined value (such as 1 mm). These are called ok-cells, and are expressed as a fraction of the total number of cells in the matrix. Alternatively, count the number of ok-cells in the LDM and the GDM and apply a formula such as:

$$\text{Merit Index} = (GDM\ \text{ok cells})/(LDM\ \text{ok cells})$$

Using this procedure for true match, the value of the Merit Index will approach 1.0, since for a true match the values of GDM and LDM will be nearly the same; but for a false match the number of GDM ok cells will be fewer than the number of LDM ok cells and their ratio will be less than 1.0.

DISCRIMINANT IV—CAPTURE AREA

While the Congruence Index (CI), Discriminant II, reveals the salient geometric features of the fingers by emphasizing and locating the distances between the phalangeal joints and the midshaft depressions, it leaves the actual shape comparisons of the slither curves to another discriminant called the Capture Area (CA). The CA parameter compares the shapes of the candidate's front, middle, and back slither curves (the KEY), with those of the stored reference curves (the LOCK). Recall that the maximum y-axis value that any of these slither curves can achieve is 1.0. By deliberately displacing the three KEY slither curves in the y-direction with respect to their corresponding LOCK curves, and then gradually bringing them into best vertical register, the normalized area (A) per pair of data points will diminish until A between the curves reaches a minimum. The capture area (CA) for one finger is the average score obtained from the front, middle, and back slither curve comparisons.

The value of CA for the ith finger can be computed from the formula: $CA_i = [1 - A_i]$ For all four fingers the final value of CA is the product of the individual values: $CA = CA_1 \times CA_2 \times CA_3 \times CA_4$ A perfect match is achieved when the three curve shapes for each of the fingers are identical, so that when the LOCK and KEY curves are moved together, the areas ($A_i$) captured between the mated curves are reduced to zero, and the value of $CA = 1.0$.

If there are several LOCKS in the GRAND LOCK, CA is computed for each, and the average value (CA) (or the product) is considered as the final score.

DISCRIMINANT V—NON-PAIR SCORE

Another discriminant available from the LOCK and KEY matrices is called the Non-Pair Score (NPS). Matrices created from registered and trimmed profiles are compared, cell by cell, as in Discriminant II. However, in the NPS discriminant the value of each cell is not used, but only whether or not the cell is filled. There will be 10 KEY matrices for 10 corresponding LOCK matrices. The 10 KEY matrices yield an average KEY matrix derived from the average value of each of the corresponding cells. For a true match, nearly every filled cell in the average KEY matrix will have a corresponding filled cell in the each of the 10 LOCK matrices. A false match yielding an average KEY made from the 10 constituent KEYS, when matched with the 10 constituent LOCKS in the GRANDLOCK will render a greater number of unpaired cells.

NPS is computed by counting the filled cells in the 10 LOCKS that do not have a mate in the average KEY matrix, and vice versa. The formula is: $NPS = [1 - np/p]$ where, np is the total number of unpaired cells and p is the total number of paired cells.

For a perfect match there will be no unpaired cells (np = 0), whereupon NPS = 1.0.

DISCRIMINANT VI—FINGER SIZE

Area Ratio or Average Width Ratio

The following is an example of a discriminant which is not based on finger shape but rather on finger size. Consider the finger profiles of a candidate to be matched to reference profiles. By summing the width values of the candidate fingers, compute the candidate area ($A_c$), and similarly obtain ($A_r$) for the reference area. By forming the ratio $A_c/A_r$, or $A_r/A_c$, whichever is smaller, obtain a new discriminant, the Area Ratio, which has the value of 1.0 for a perfect size match, and less than 1.0 where the finger sizes are poorly matched. The areas $A_r$ can be expressed as the product of an average width $W_r$ and a length L, and similarly $A_c = W_c L$. The lengths (L) are the same because the corresponding finger lengths were equalized by the process of registering and trimming the profiles. Hence the Area Ratio $A_c/A_r = W_c/W_r$ (or $A_r/A_c = W_r/W_c$) becomes the ratio of Average Widths.

The list of potential discriminants is very large. Additional discriminants may be derived to discriminate between true and false matches. From among these, select the most promising combination which will lead to an appropriate accept/reject decision. Since each discriminant has a maximum value (for a perfect match) of 1.0, multiply (or average) them to obtain a GRAND MATCH NUMBER which itself has a maximum value of 1.0. The quest for the optimal combination of discriminants is an evolving process aimed at yielding the lowest possible Type I and Type II error rates.

This invention combines a low error rate with a fast decision time, at a lower cost than other verification devices. Hand geometry is a socially acceptable and clean biometric measure which is virtually impossible to forge. Mechanically, the system is reliable and easy to operate. Personnel data is encoded using available random access memory or magnetic stripe technology, while storage of a remotely located data base can be in various forms. The decision algorithms used in the system can be encrypted and are difficult to replicate or forge.

The typical embodiment described herein shows a linear CCD (charge couple device) sensor array in the scanning camera's image plane across which the image of the fingers is swept by means of a moving mirror. One alternative would substitute a two-dimensional CCD high resolution sensor array which, although more costly, would eliminate the need for a scanning mirror and would simplify the mechanical design. Also, the embodiment described above uses a panel backlighted by incandescent or fluorescent light sources. A high-powered flat electroluminescent panel could be used, in which case the CCD sensors must be spectrally matched to the quality of the light. Further, instead of backlighting to create the silhouette image, the panel on which the hand rests could be of a dark color while illumination of the fingers could be accomplished from above via a half-silvered mirror which would also direct the hand image to the scanning camera.

Further, width profiles have been described as forming the basis from which the various discriminants have been derived. The finger width profiles have been described as being generated from left and right edge silhouettes of the finger images. Thus, there are eight edge silhouettes for the four fingers of each hand which may also be treated independently in the same manner as width profiles to provide means for testing the validity of a candidate's request for access.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claim.

What is claimed is:

1. A method of identifying an individual based on the profile of one or more fingers on a hand, the method comprising the steps of creating a reference template by
   a) determining the location of the edges of each finger separately,
   b) establishing a central axis for each finger by reference to the edges thereof,
   c) rotating the central axis of each finger until it is normal to a common reference line,
   d) determining the finger profile by measuring the distance of each finger edge from its central axis at predetermined locations parallel to said reference line, and
   e) recording said finger profile information as a template; and thereafter
   determining a candidate's finger profile by following steps a) to d) above,
   comparing the candidate's finger profile with the reference template,
   determining whether the correspondence between the candidate's finger profile and the reference template meets certain predetermined criteria, and
   indicating acceptance or rejection of the candidate.

2. In the method of claim 1 for both the reference template and the candidate's finger profile further comprising the method steps of
   making an exact copy of a section of each finger profile,
   progressively displacing the copied section of each finger profile relative to its own finger profile along its central axis to develop an autocorrelation curve to exaggerate salient shape features of the finger profile, and
   comparing the autocorrelation curve of the reference template to the autocorrelation curve of the candidate's finger profile.

3. The method of claim 2 further including the step of locating the joints and mid shaft depressions of each finger profile by reference to the autocorrelation curve.

4. The method of claim 1 further comprising the steps of
   recording both right and left hand finger profile data at the time the reference template is created,
   determining whether the right or left hand is presented for comparison by analyzing lengths of each finger, and
   retrieving the right or left finger profile data for comparison with the reference template.

5. The method of claim 1 wherein the location of the edges of each finger is determined by
   placing the hand on a panel,
   illuminating the panel on the side opposite the hand,
   viewing a silhouette image of the fingers by means of a scanning video camera, and
   scanning the fingers of the hand generally transversely to the central axis of the fingers to determine the locations of the edges of each finger at each scan thereby to develop a finger profile.

6. The method of claim 1 wherein said step of comparing includes the step of
   changing the register between the reference and the candidate finger profiles along the central axis until a maximum coefficient of determination is obtained.

7. The method of claim 1 wherein the step of determining location of edges further includes the step of determining the length of each finger separately,
   and wherein the step of comparing includes the step of comparing corresponding finger lengths.

8. The method of claim 1 wherein the step of comparing the finger profiles to the reference template includes the step of establishing for each finger the width of each transverse slice from web to tip and then comparing the corresponding widths, slice-by-slice.

9. The method of claim 1 wherein the step of comparing the candidate finger profiles to the reference template includes the step of summing the width values, slice-by-slice, from web to tip along the length of each finger thereby to obtain the candidate and reference average width.

10. A method of generating an autocorrelation curve from the profile of one or more fingers, the method comprising the steps of determining the location of the edges of each finger separately thereby to generate a set of finger profiles, establishing a central axis for each finger profile by comparing the edges thereof, rotating the central axis of each finger profile until it is normal to a reference line, making an exact copy of a section of each finger profile, displacing the section of each finger profile relative to its corresponding finger profile to exaggerate salient shape features of the finger profile.

11. The method of claim 10 further including the step of determining the distance between finger joints by comparing a finger autocorrelation curve with its exact copy.

12. An apparatus for verifying the identity of a candidate based on finger profiles including means for determining a profile of each finger by locating the edges thereof, said means including a back lighted panel and video means for sensing the location of said finger edges, means for determining each finger profile independently of its orientation on said panel, means for storing a reference template comprising the finger profiles of an individual, means for comparing the finger profiles of a candidate to said reference template, and means for indicating when the candidate's finger profiles are within predetermined limits of sameness with regard to said reference template.

13. The apparatus of claim 12 wherein said video means includes a scanning video camera.

14. The apparatus of claim 12 wherein said video means includes a photosensitive linear array, a mirror, and a motor for moving the mirror to scan the fingers placed on said back lighted panel.

15. The apparatus of claim 12 wherein said video means includes a two-dimensional photosensitive array.

16. A method of verifying the identity of an individual based on the profile of one or more fingers, the method comprising the steps of determining the location of the edges of each finger separately thereby to generate a set of finger profiles, establishing a central axis for each finger profile by comparing the edges thereof, rotating the central axis of each finger profile until it is normal to a common reference line, comparing a selected area of a finger profile to a corresponding area of a previously stored reference finger profile.

17. The method of claim 16 further including the step of registering and trimming each rotated finger profile prior to comparing the area thereof to a previously stored reference finger profile.

18. The method of claim 16 further including the step of registering and trimming each rotated finger profile prior to comparing the area thereof to a previously stored reference finger profile.

* * * * *